(12) United States Patent
Hayama et al.

(10) Patent No.: US 6,970,786 B2
(45) Date of Patent: Nov. 29, 2005

(54) METHOD FOR TRANSMITTING MAP DATA AND MAP DISPLAY APPARATUS AND SYSTEM

(75) Inventors: Yoichi Hayama, Okazaki (JP); Mamoru Kainuma, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 7 days.

(21) Appl. No.: 10/316,114

(22) Filed: Dec. 11, 2002

(65) Prior Publication Data
US 2004/0204843 A1    Oct. 14, 2004

(30) Foreign Application Priority Data
Dec. 25, 2001  (JP)  ............................... 2001-392302
Dec. 25, 2001  (JP)  ............................... 2001-392303

(51) Int. Cl.[7] .......................................... G01C 21/30
(52) U.S. Cl. .................. 701/209; 701/202; 340/995.1; 340/995.17
(58) Field of Search ............................... 701/209, 200, 701/208, 211–212; 340/995.1, 995.12; 342/357.09

(56) References Cited

U.S. PATENT DOCUMENTS

| | | | |
|---|---|---|---|
| 5,648,769 A | * | 7/1997 | Sato et al. .................. 340/988 |
| 6,434,482 B1 | * | 8/2002 | Oshida et al. ............... 701/209 |
| 6,484,093 B1 | * | 11/2002 | Ito et al. ...................... 701/211 |
| 6,542,815 B1 | * | 4/2003 | Ishizaki et al. ............. 701/209 |
| 6,542,816 B1 | * | 4/2003 | Ito et al. ...................... 701/209 |
| 2002/0040271 A1 | * | 4/2002 | Park et al. ................... 701/209 |
| 2003/0158650 A1 | * | 8/2003 | Abe et al. .................... 701/200 |

FOREIGN PATENT DOCUMENTS

| | | |
|---|---|---|
| JP | 11-237251 | 8/1999 |
| JP | 11-339182 | 12/1999 |
| JP | 2000-036097 | 2/2000 |
| JP | A 2001-084493 | 3/2001 |
| JP | 2001-148091 | 5/2001 |
| JP | 2001-216235 | 8/2001 |

* cited by examiner

Primary Examiner—Gertrude A. Jeanglaude
(74) Attorney, Agent, or Firm—Oliff & Berridge, PLC

(57) ABSTRACT

A map display apparatus for receiving and displaying map data transmitted from an information center. The map display apparatus includes a reporting device to report data-transmission expenses or data-transmission time required in receiving the map data from the information center; a determining device that allows a user to determine whether to receive the map data from the information center; and a requesting device to request the information center to transmit the map data upon a user's determination of receiving the map data.

12 Claims, 14 Drawing Sheets

| DATA A | DATA B | DATA C |
|---|---|---|
| ROAD #A1 | ROAD #B1 | ROAD #C1 |
| ⋮ | ⋮ | ⋮ |
| ROAD #An | ROAD #Bn | ROAD #Cn |

ROUTE DESCRIPTION

| ROUTE COMPARISON | NET | NAVIGATION |
|---|---|---|
| CHARGES FOR TOLL ROADS | 5500 YEN | 6000 YEN |
| ESTIMATED TIME OF ARRIVAL | 15:30 | 16:02 |
| TRAVEL DISTANCE | 220km | 250km |

START DATA-TRANSMISSION?

YES    NO

FIG. 9

| SEARCH REQUIREMENTS | |
|---|---|
| COORDINATES OF THE STARTING POINT AND THE DESTINATION<br>TOLL ROAD PREFERENCE<br>USE OF A FERRY<br>•<br>• | |
| SEARCH PARAMETERS (LINK COST) | |
| EXPRESSWAY | 0.4 |
| TOLLROAD | 0.6 |
| COUNTRY ROAD | 1.0 |
| ORDINARY ROAD | 1.1 |
| •<br>• | •<br>• |
| OTHER SEARCH PARAMETERS (COST OF A POINT BETWEEN EACH LINK) | |
| TRAFFIC LIGHT COST | 400m |
| RIGHT TURN COST | 100m |
| LEFT TURN COST | 50m |
| •<br>• | •<br>• |

FIG. 10

ROUTE COMPARISON

| EXPENSE | 0.3m / YEN |
| TIME | 5.0m / SEC. |
| TRAVEL DISTANCE | 0.5m / m |

ROUTE SETTING

METHOD FOR TRANSMITTING MAP DATA AND MAP DISPLAY APPARATUS AND SYSTEM

BACKGROUND OF THE INVENTION

1. Field of Invention

The invention relates to a map display system, a map display apparatus, and a map display method, wherein map data is transmitted from an information center and thereby updated.

2. Description of Related Art

An in-car map display apparatus with conventional navigation functions uses map data stored on a disc and thereby performs navigation functions particularly such as a route search and route guidance. However, there exist some problems in the use of such disc since data stored on the disc soon becomes outdated because of yearly repair or reconstruction of roads. Such outdated disc with no data about a new open road or about an out-of-service road causes some problems: a desirable route is not calculated, necessary route guidance is not provided, and a latest-revised toll for an expressway is not ascertained. To solve such problems, one approach proposes using up-to-date data retrievable from data servers over the Internet. Further, from an economical point of view, another approach (as described in Japanese Patent Laid-open No. 2001-84493) proposes limiting the amount of data to be retrieved so as not to waste data-transmission expenses and data-transmission time.

In order to avoid wasteful expenses and time, a conventional in-car map display apparatus generally limits and reduces the amount of the data to be retrieved over a network. For example, when retrieving the up-to-date data, data stored in the conventional in-car map display apparatus is compared with data stored in a server in order to determine a version of the data. Further, the conventional in-car map display apparatus retrieves only data about a route related to a user-designated destination.

SUMMARY OF THE INVENTION

Disadvantageously, however, the conventional in-car map display apparatus discussed above does not allow a user to judge or determine the usefulness of information to be received. This creates a problem such that the user is charged with data-transmission expenses for receiving unnecessary data. One such example is a case where a route to a user-designated destination is searched by the server and such route is the very same as a route searched by the in-car map display apparatus. In this case, it does not matter if the data stored in the in-car map display apparatus is outdated or not; the user is still charged with data-transmission expenses for the data unnecessarily retrieved from the server. Another case is where the route searched by the server differs slightly from the route searched by the in-car map display apparatus. In this case, the data, for example, new route retrieved from the server, may not deserve the data-transmission expenses. In the end, however, the user is still charged with data-transmission expenses regardless of the usefulness of the retrieved data.

For solving aforesaid problems, it is an objective of the invention to determine whether to retrieve information from the information center in order for the user to retrieve necessary or serviceable information. Further, it is another objective of the invention to determine whether to transmit information between the information center and the map display apparatus in order that the information might be transmitted based on such determination.

In one exemplary embodiment according to this invention, a map display apparatus for receiving and displaying map data transmitted from an information center, comprises: a reporting device to report data-transmission expenses or data-transmission time required in receiving the map data from the information center; a determining device that allows a user to determine whether to receive the map data from the information center; and a requesting device to request the information center to transmit the map data upon a user's determination of receiving the map data.

In another exemplary embodiment according to this invention, a map display apparatus for receiving and displaying map data transmitted from an information center, comprises: a data-transmission device to transmit destination data to the information center; a searching device to search a route to a destination; and a reporting device to report a searched route data of the map display apparatus and a transmitted route data transmitted from the information center by comparing the map display apparatus searched route data and the information center transmitted route data.

Further, in yet another exemplary embodiment according to this invention, a map display apparatus for receiving and displaying map data transmitted from an information center, comprises: a data-transmission device to transmit destination data to an information center; a searching device to search a route to a destination; a determining device to determine whether to receive map data from the information center by comparing the searched route with a route transmitted from the information center; and a requesting device to request the information center to transmit of the map data upon a determination of receiving the map data.

BRIEF DESCRIPTION OF THE DRAWINGS

The invention will be described with reference to the drawings, in which:

FIG. 9 exemplarily shows a display screen on which a route searched by the information center is compared with a route searched by the in-car terminal device so as to determine whether to retrieve data.

FIG. 10 exemplarily shows requirements and parameters transmitted between the information center and the in-car terminal device, which are used in integrating respective route search results by the information center and the in-car terminal device into one route search result.

DETAILED DESCRIPTION OF PREFERRED EMBODIMENTS

Embodiments according to the invention will be described hereinafter in detail with reference to the accompanying drawings.

Figure 1:
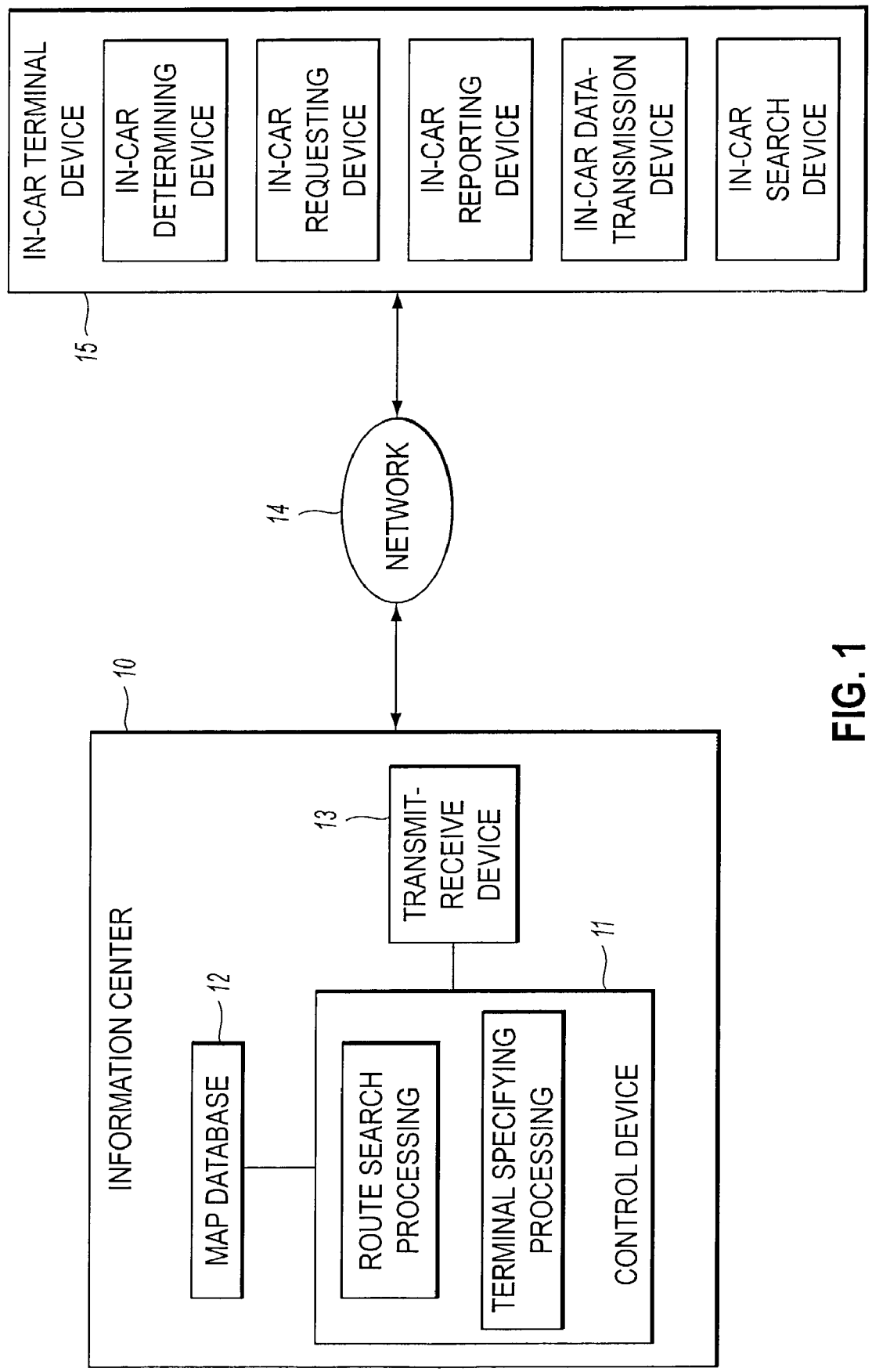
FIG. 1 is a block diagram of a map display system according to an exemplary embodiment of the invention.

FIG. 1 is a block diagram of a map display system according to an exemplary embodiment of the invention. As shown in FIG. 1, the map display system includes a map display apparatus, such as, for example, an in-car terminal device, that includes a determining device to determine whether to receive map data from an information center, and a requesting device to make a request to an information center for transmission of the map data upon a determination of receiving the map data; an information center from which the map data is transmitted to the map display apparatus when the request for transmission of the map data is made from the map display apparatus; and a reporting device to report data-transmission expenses or data-transmission time required in receiving the map data by the map display apparatus.

In another exemplary embodiment according to this invention, a map display system comprises a map display apparatus, such as, for example, an in-car terminal device, that includes a transmission device to transmit destination data to an information center a searching device to search a route to a destination, a determining device to determine whether to receive map data from the information center, and a requesting device to request to the information center for transmission of the map data upon a determination of receiving the map data; and an information center that includes a searching device to search a route based on a received destination data and a transmission device to transmit the map data to the map display apparatus when the request for transmission of the map data is made from the map display apparatus; wherein the determining device compares the searched route with the route transmitted from the information center so as to determine whether to receive the map data from the information center.

As shown in FIG. 1, the information center 10 comprises: a control device 11 to search a route and to specify a terminal device to which data is transmitted, a map database 12 storing up-to-date map data, and transmit-receive device 13. The information center 10 transmits data to an in-car terminal device 15 via a network 14 so as to service the up-to-date map data and a route search by request from the in-car terminal device 15. The map database 12 stores up-to-date information, for example, information about a renewed road, a new open road, and latest-revised toll for an expressway. When receiving the route search request from the in-car terminal device 15, the control device 11 searches the map database 12 for a route. The control device 11 stores identification data about each in-car terminal device 15 registered with the information center 10. Based on this identification data, the in-car terminal device 15 is specified and thereby each in-car terminal device 15 is provided with the map data.

The in-car terminal device 15 has a disc on which map data is stored. When a destination is inputted, the in-car terminal device 15 searches a route and displays it on a map so as to provide route guidance with a user. Generally, the map data stored on the disc gets outdated quickly and remains obsolescent unless it is replaced with a new disc having new map data. Therefore, sometimes, such outdated disc causes a problem where a user-desired route is not searched. To correct such problem, some users may buy a new disc. Other users, however, may not want to do so. For those users who dislike buying a new disc but still would want to know a route that reflects the most up-to-date information, the information center 10 can provide him/her with the up-to-date map data or the up-to-date route. For example, when data about a starting point (i.e., a vehicle present position detected by a present position detection device, or a present position point inputted by the user) together with data about a destination are transmitted to the information center 10 via the network 14 and a request is made for the up-to-date map data, the information center 10 starts searching a route. When the user confirms that he would like to receive the map data, the most up-to-date map data or the up-to-date route is downloaded into the in-car terminal device 15.

Figure 2:
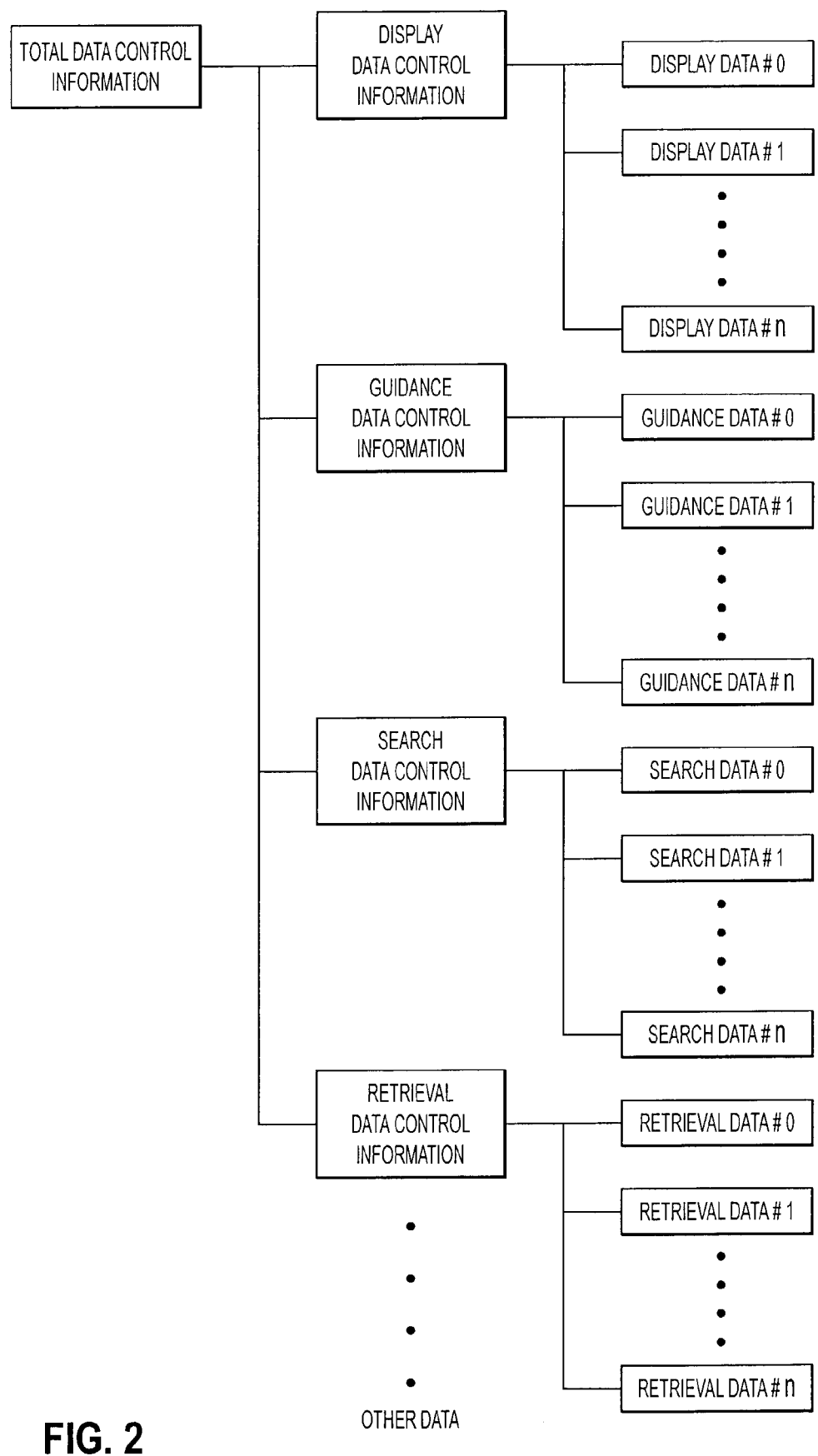
FIG. 2 shows a configuration of an exemplary map data stored in an in-car terminal device.

FIG. 2 shows a configuration of map data included in an in-car terminal device. The map data hierarchically comprises: total data control information for controlling all data; categorized information classified according to four functions, such as display data control information, guidance data control information, search data control information, retrieval data control information; and display data, such as, for example, road data to be displayed on a map display apparatus, guidance data, such as, for example, intersection name data, attention point data, road name data, and road name voice data, search data, such as, for example, including, network data representing roads which having been used in searching a route, and retrieval data, such as, for example, including, facility names, telephone numbers, and addresses.

The following describes in detail an exemplary embodiment case where new map data is retrieved from the information center in order to update the old map data stored on the disc in the in-car terminal device.

Figure 3:
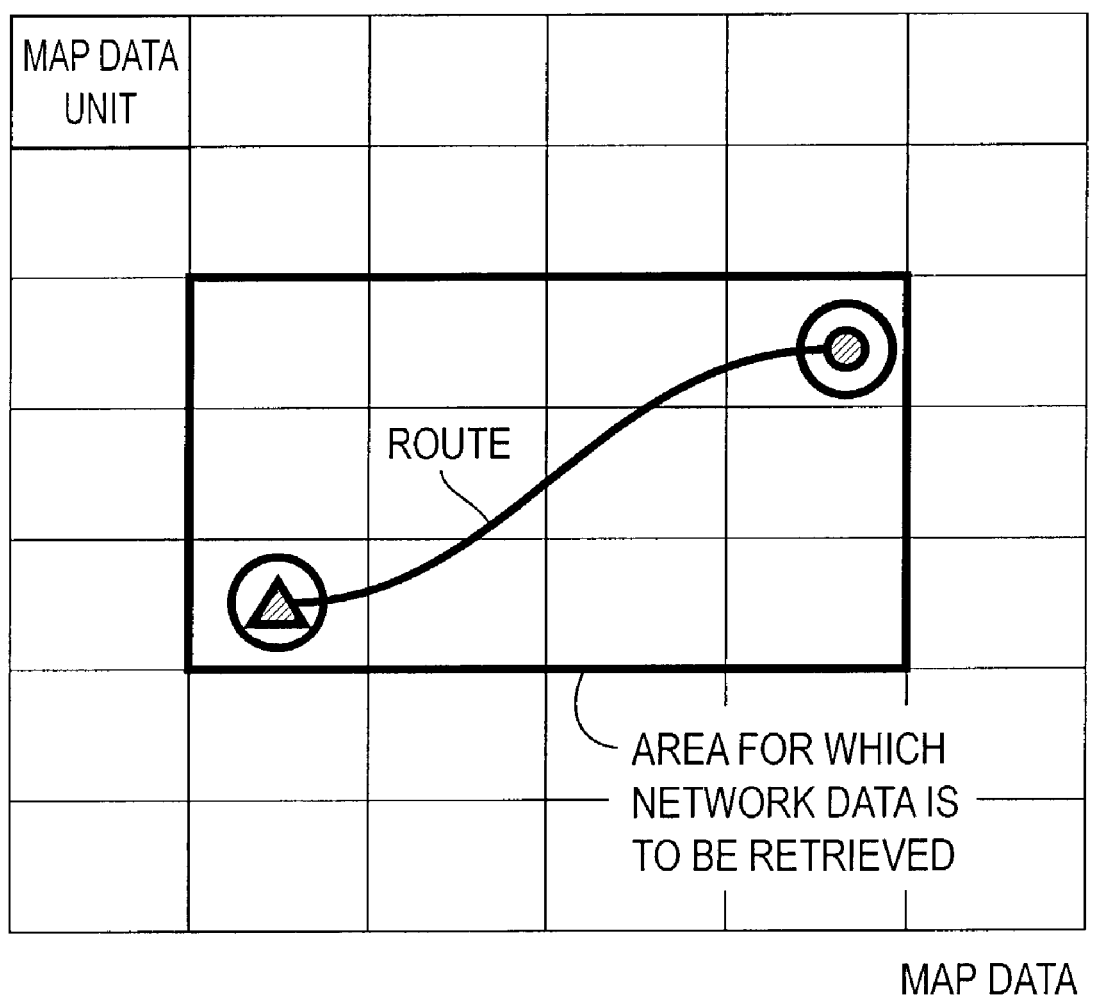
FIG. 3 exemplarily shows an area for which network data is to be retrieved.

FIG. 3 shows an area for which network data is to be retrieved. Here, network data means the map data stored in the information center. As shown in FIG. 3, each actual data unit of the map contains data about each rectangle area into which the map covering an actual area is equally divided.

Based on such rectangle areas, the route from a starting point to a destination can be searched. Based on the searched route results, guidance can be provided to the user. Specifically, when the information about the starting point and the destination are transmitted from the in-car terminal device to the information center, the map data, such as, for example, display data, guidance data, search data, or retrieval data about rectangle areas including the starting point and destination (i.e., the rectangles bordered by a solid line in FIG. 3) are retrieved and transmitted from the information center. Based on such retrieved map data, the in-car terminal device provides guidance regarding the route search.

In another exemplary embodiment according to the invention, the information center performs a route search and the in-car terminal device performs route guidance. Specifically, upon receiving the route searched by the information center, the in-car terminal device transmits to the information center only the guidance data about the area for which the map data is to be retrieved (for example, as shown in FIG. 3). Then, based on such retrieved guidance data, guidance on the searched route is given to the user.

Figure 4:
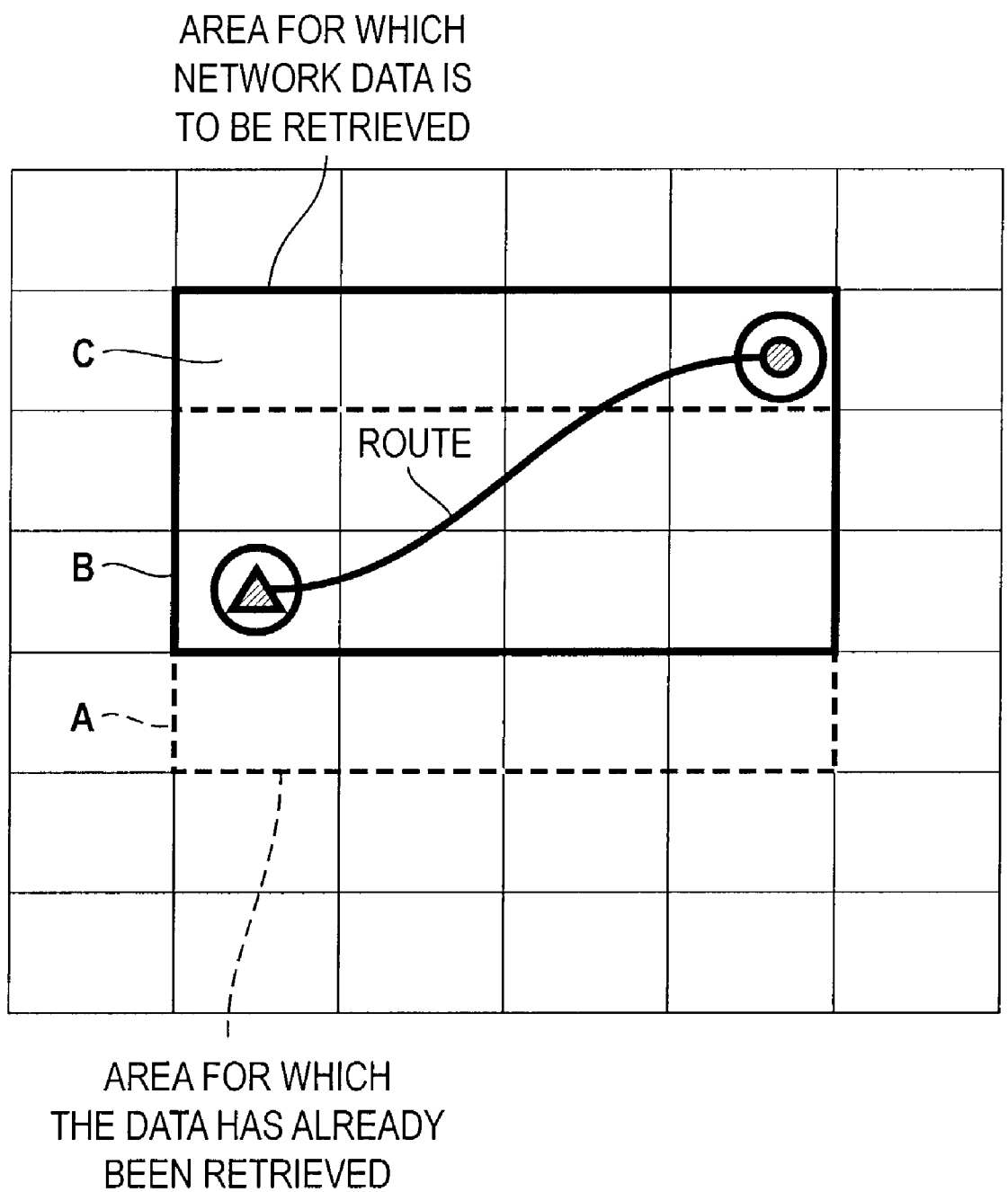
FIG. 4 exemplarily explains a method of retrieving data from an information center while the in-car terminal stores some data which having been retrieved before.

FIG. 4 graphically explains a method of retrieving data from an information center while the in-car terminal stores some previously retrieved data.

In FIG. 4, an area A (as a rectangle area bordered by a broken line) represents the area for which the data has already been retrieved from the information center. The data, especially the road data which has already been retrieved from the information center, is stored into storage device, such as, for example, a hard disc or memory included in the in-car terminal device. Such retrieved road data is stored accompanied by data version information. When information about the starting point and the destination are transmitted to the information center to retrieve up-to-date information, the in-car terminal device compares a version of the already-retrieved data with that of to-be-retrieved data (in light of a date or a version of the data). When this comparison determines that the version of to-be-retrieved data and the version of already-retrieved data are the same, no further data is retrieved from the information center. Further, when the comparison finds that the area covered by the to-be-retrieved data partially overlaps the area covered by the already-retrieved data, no data about such partially overlapped area is retrieved from the information center. In other words, data can be retrieved from the information center when the version of to-be-retrieved data and that of the already-retrieved data are different, or when the area covered by the to-be-retrieved data does not overlap the area covered by the already-retrieved data. These cases are illustrated in FIG. 4.

FIG. 4 illustrates a case where a rectangle area B (bordered by a solid line) including the starting point and the destination is considered as a possible area for which network data is to be retrieved. Here, the rectangle area B partially overlaps the area A (bordered by a dashed line) under the situation in which the version of the already-retrieved data about the area A is the same as the version of the to-be-retrieved data about the area B. In such case, data about only an area C, where the area A and the area B do not overlap each other, can be retrieved from the information center. Consequently, with aforesaid method of retrieving data from the information center, the amount of the data to be transmitted to the in-car terminal device can be reduced. This approach reduces the data-transmission expenses, data-transmission response time, search response time, and/or guidance response time.

The following describes a case where a map system according to the invention includes a device that provides a user with both estimated data-transmission expenses and estimated data-transmission time required in retrieving data from the information center so as to determine whether to retrieve data from the information center.

Figure 5:
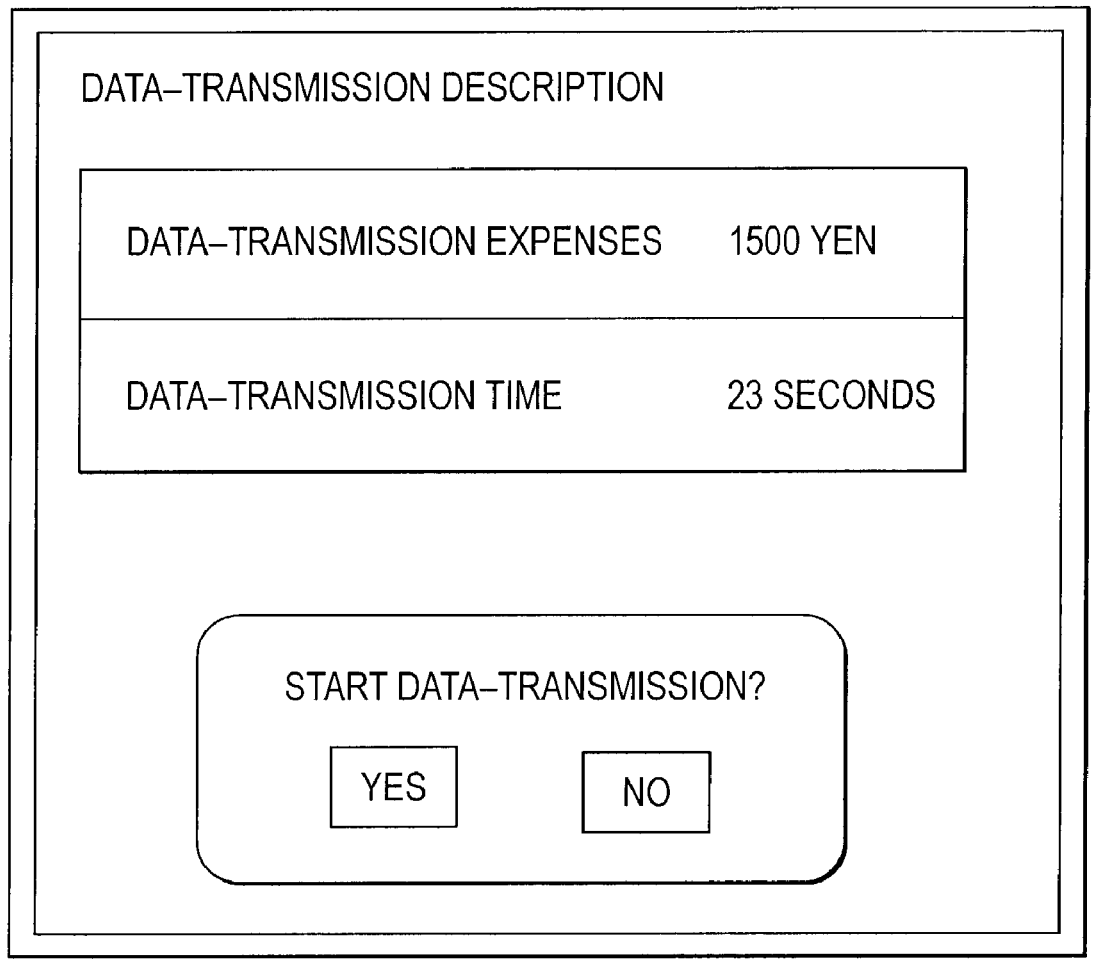
FIG. 5 exemplarily shows a display screen on which estimated data-transmission expenses and estimated data-transmission time required in retrieving data from the information center are presented to a user.
Figure 6:
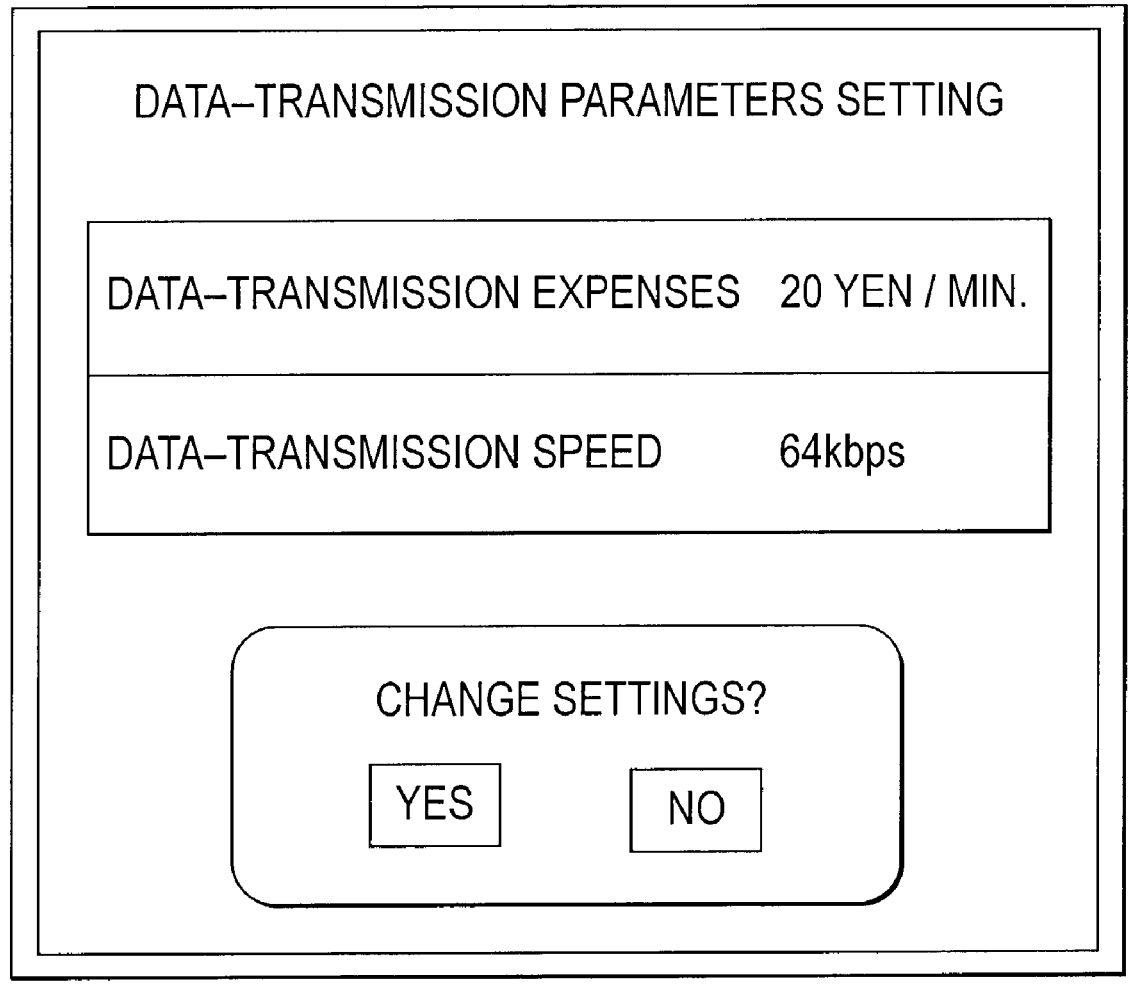
FIG. 6 exemplarily shows a data-transmission parameters setting screen.

FIG. 5 exemplarily shows a display screen on which estimated data-transmission expenses and estimated data-transmission time required in retrieving data from the information center are presented to a user. FIG. 6 shows data-transmission parameters setting screen. As shown in FIG. 5, the data-transmission expenses and the data-transmission time are displayed onto a display screen in the in-car terminal device. Referring to such displayed information, the user can preliminarily determine whether to retrieve the data from the information center before starting the data-transmission. On the display screen, a message is displayed as "Start data-transmission?" The determination whether to start the data-transmission to retrieve the data from the information center is finalized by selecting either "YES" or "NO" button displayed on the screen.

In addition to the display screen in FIG. 5, another display screen, as shown in FIG. 6, is provided for a revision of the data-transmission parameters, such as, for example, data-transmission expenses and data-transmission speed. Since data-transmission parameters change as occasion demands, the data-transmission parameters setting screen allows the user to reset the data-transmission expenses and the data-transmission speed per minute as shown in FIG. 6. Both the data-transmission expenses and the data-transmission speed are set by the user or automatically set by the information center. Once the data-transmission parameters are set, the data-transmission expenses and the data-communication time actually spent by the user are calculated based on the amount of the data transmitted between the information center and the in-car terminal device.

Figures 7, 8:
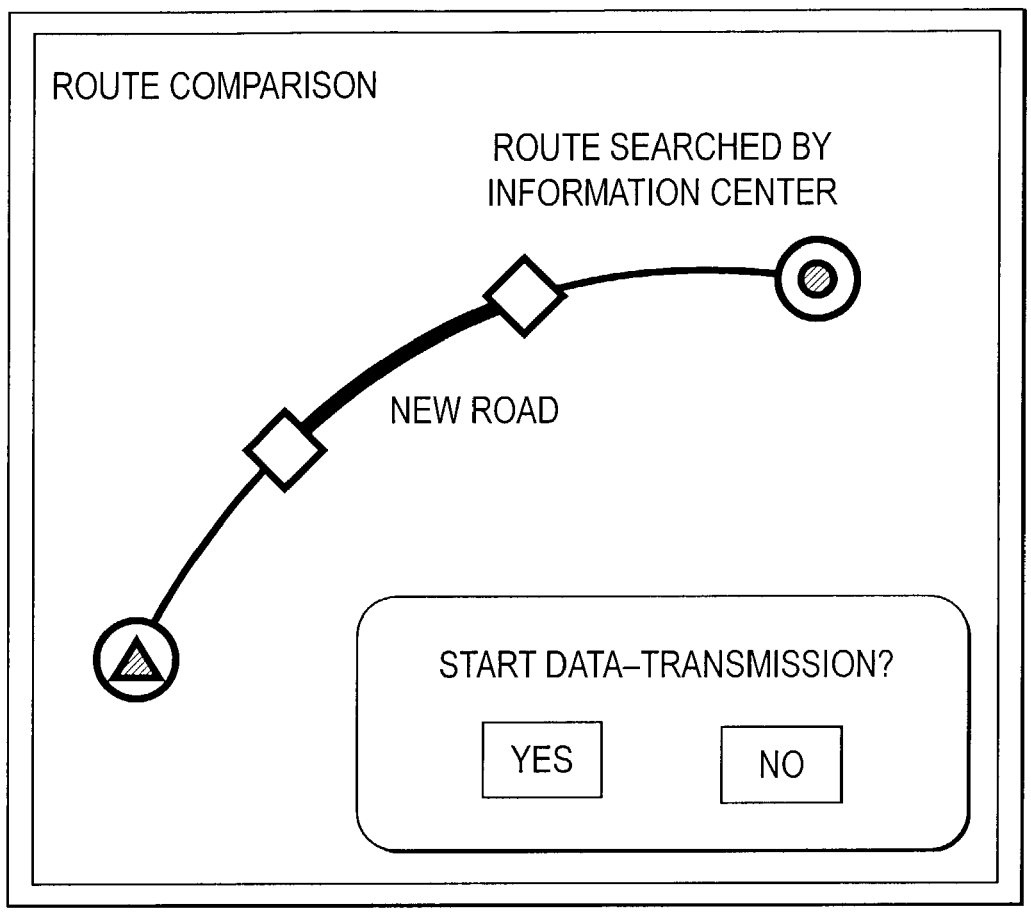
FIG. 7 exemplarily shows a case where data is retrieved when a new road or an out-of-service road exists.
FIG. 8 exemplarily shows correspondence of roads in several data versions.

FIG. 7 exemplarily shows a case where data is retrieved when a new road or an out-of-service road exists. FIG. 8 exemplarily shows correspondence of roads in several data versions of the map data.

Since the map data stored in the information center is constantly updated, such most up-to-date data includes improved roads or new open roads, and excludes out-of-service roads. However, the map data stored in the in-car terminal device may sometime include the out-of-service roads without representing the improved roads or new open roads. In such case, the data retrieval is carried out as follows. First, the in-car terminal device transmits the data about the starting point and the destination to the information center. Based on such transmitted data, the information center searches a route and then transmits the searched route back to the in-car terminal device. Next, the in-car terminal device compares the searched route with a road represented by the map data already-retrieved from the information center and stored in itself, or the in-car terminal device compares the searched route with a route searched by itself. Then, the in-car terminal device presents to the user the road stored only in the information center but not stored in the in-car terminal device. Alternatively, the in-car terminal device presents to the user the road stored only in the in-car terminal device but not stored in the information center. The information presented enables the user to determine whether to retrieve the data from the information center.

Specifically, the information center searches a route based on the information about the starting point and the destination point transmitted from the in-car terminal device. The searched route, which includes information about a road attribute and a road shape of the searched route, is transmitted back to the in-car terminal device. Then, the data transmitted from the information center, which specifies a type, attribute, and shape of roads located on the searched route, is compared with the already-received map data stored in the in-car terminal device, which specifies a type, attribute, and shape of the roads. If the type, attribute, and shape of the searched route best correspond with those of the road represented by the map data, the route searched by the information center is determined as a corresponding road. If the type, attribute, and shape of the searched route does not correspond with those of the road represented by the map data, the route searched by the information center is determined as a new road or an out-of-service road. Otherwise, the route searched by the in-car terminal device and the route searched by the information center are compared with each other. If this comparison determines that certain roads located on the route searched by the in-car terminal device partially differ from roads located on the route searched by the information center, such different roads are distinguishably displayed from the other roads located on the route. For example, as shown in FIG. 7, the new open road determined by the above comparison is displayed in a distinguishable way onto the display screen.

For searching the corresponding roads, besides the comparison of the shape and attribute of the roads, it is also possible that a server is asked for such corresponding road if the system includes such server that controls various data. For example, when the server includes road data associated with various disc versions (such as, Data A, Data B, and Data C) and road numbers as shown in FIG. 8, the new road or the out-of-service road can be searched by the server. Specifically, in operation, the server searches through the data stored on the disc in the in-car terminal device for the new road or the out-of-service road located on the route. If the new road or the out-of-service road is found, such road is transmitted to the in-car terminal device and displayed as shown in FIG. 7.

FIG. 9 exemplarily shows a display screen on which a route searched by the information center is compared with a route searched by the in-car terminal device to determine whether to retrieve data. In this case, data about a starting point and a destination are first transmitted to the information center from the in-car terminal device in order to search a route. The route is searched not only by the information center but also by the in-car terminal device based on such transmitted data. Then, a comparison is performed over the respective routes searched by the information center and the in-car terminal device. This comparison is performed in terms of route features or the display data, such as, for example, main roads located on the searched routes, charges for toll roads located on the searched routes, estimated time of arrival for the searched routes, and/or route distances of the searched routes. These display data are received and displayed onto the screen. In FIG. 9, data listed in the "Net" column represents the data about the route searched by the information center and then received by the in-car terminal device, while data listed in the "Navigation" column represents the data about the route searched by the in-car terminal device. The data for the route comparison are displayed onto the display screen together with a message asking whether to "Start data-transmission?" The determination whether to start the data-transmission to retrieve the data from the information center is finalized by selecting either "YES" or "NO" button on the display screen. Since the map data (i.e., route features) for each searched route is displayed onto the screen, the user can readily compare the route searched by the information center with the route searched by the in-car terminal device in terms of the charges for the toll road, the estimated time of arrival, and the route distance. This allows the user to consider the benefit of the data-transmission between the information center and the in-car terminal, and thereby the user can understandably determine whether to retrieve the data from the information center.

FIG. 10 exemplarily shows requirements and parameters transmitted between the information center and the in-car terminal device. These requirements and parameters are used in integrating respective route search results by the information center and the in-car terminal device into one search result.

In FIG. 10, search requirements include, for example, coordinates of the starting point and the destination, toll road preference, and use of a ferry. Search parameters shown as costs weighed on road links include coefficients which representing a cost weighed on an expressway, on a toll road, on a county road, and an ordinary road. Here, the cost means a weight given to data used in searching a road. Other search parameters include distances into which a cost weighed on a traffic light, on a right turn, and on a left turn are converted. These requirements and parameters may be changed according to the functions given to the in-car terminal device or according to a type of user. Therefore, when a route is searched by the information center, it is desirable that the information center use the same requirements and parameters as the in-car terminal device uses. For this, the search requirements and parameters used in the in-car terminal device should be transmitted to the information center in order that the route be searched by the information center and by the in-car terminal device under the same conditions. Thus, the comparison between the route searched by the information center and the route searched by the in-car terminal device can be properly performed. Further, when the route is searched only by the information center, the search requirements and parameters used in the information center must match those used in the in-car terminal device. Therefore, when searching a route, the requirements and the parameters should be generally transmitted between the information center and the in-car terminal device. This data-transmission is also performed in a manner that the requirements and the parameters are transmitted from the information center to the in-car terminal device so that the requirements and the parameters used in the in-car terminal device may be matched with those used in the information center.

Figure 11:
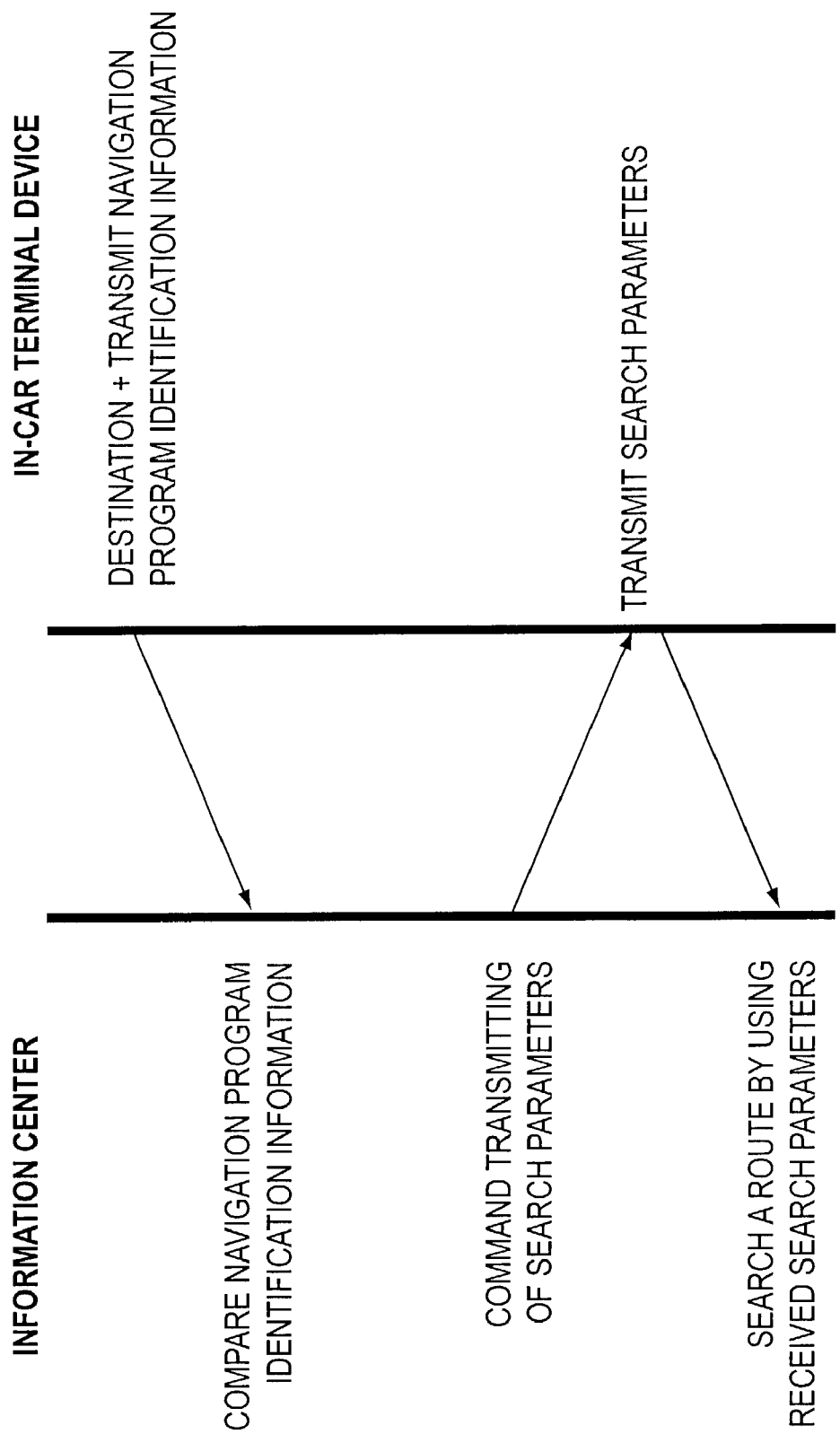
FIG. 11 exemplarily shows a case where the requirements and the parameters are transmitted between the information center and the in-car terminal device.

FIG. 11 exemplarily shows a case where the requirements and parameters are transmitted between the information center and the in-car terminal device.

As shown in FIG. 11, when destination data is transmitted from the in-car terminal device to the information center, identification information (version information) about a navigation program stored in the in-car terminal device is also transmitted to the information center. The information center then compares identification information about a navigation program stored in itself with the transmitted identification information about the navigation program from the in-car terminal so as to determine whether the search parameters used in the information center and the search parameters used in the in-car terminal device should be matched to each other.

When it is determined that said both search parameters should be matched to each other, the information center commands the in-car terminal device to transmit the search parameters used in the in-car terminal device. Upon the receipt of such command, the in-car terminal device transmits the search parameters to the information center. Then, based on said search parameters transmitted from the in-car terminal device, the information center searches a route.

Both, the information center, as well as the in-car terminal device, can perform the determination whether the search parameters should be matched or not. In other words, the in-car terminal device may compare the identification information about the program transmitted from the information center with its own program identification information. Further, alternatively to the steps shown in FIG. 11, the search parameters or the search programs used in the in-car terminal device may get matched with those used in the information center. In this case, the information center transmits the search parameters or the search programs to the in-car terminal device, and then the in-car terminal device searches a route based on the information transmitted from the information center. Generally, not only the parameters but also the programs may be subjected to the matching between the information center and the in-car terminal. In the case of the programs subjected to such matching, only the search program is transmitted between the information center and the in-car terminal device. Otherwise, the search program may be transmitted together with matching program and map display program between the information center and the in-car terminal device.

Figure 12:
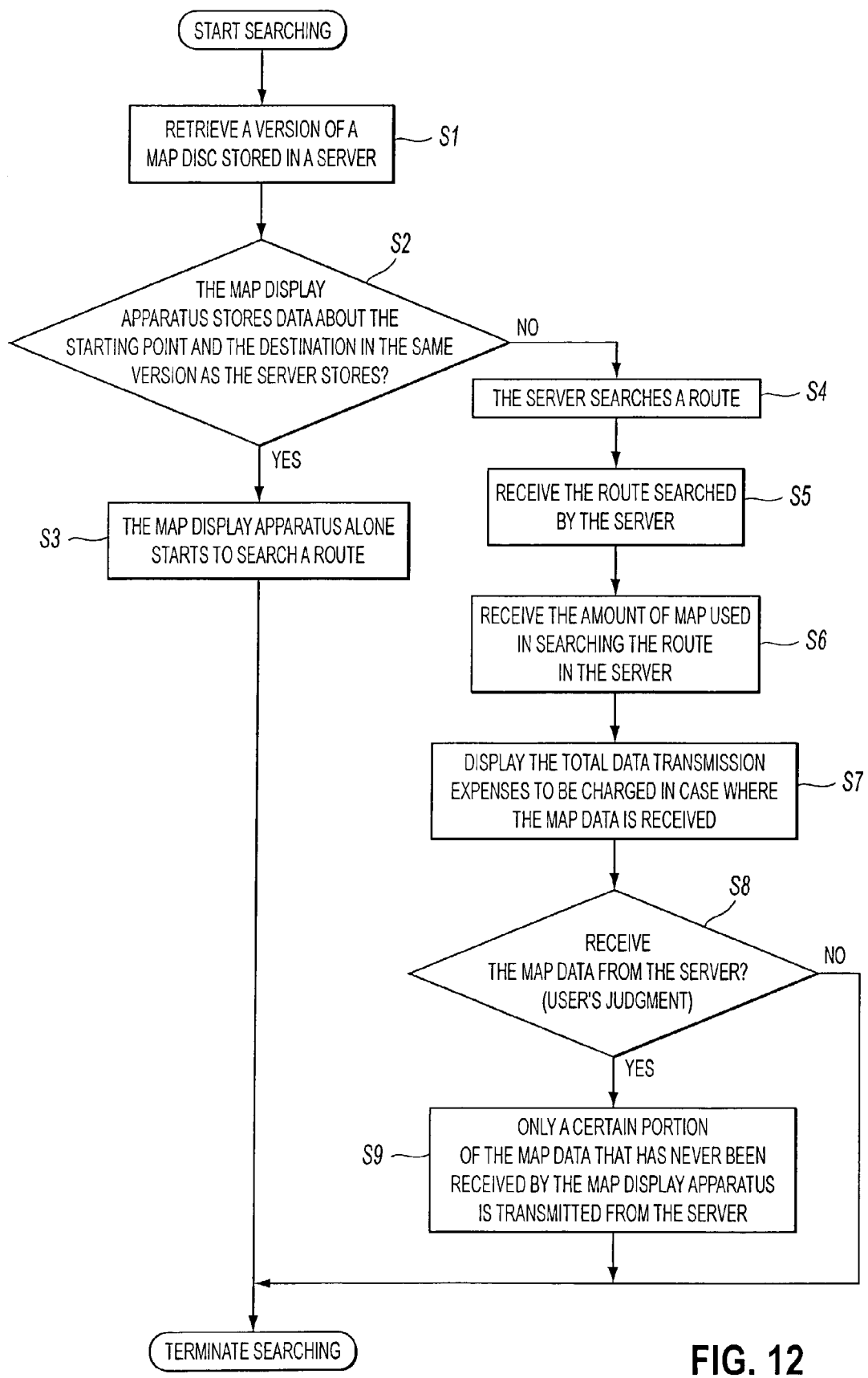
FIG. 12 is an exemplary embodiment of a flowchart showing a method for retrieving map data.

FIG. 12 is a flowchart showing an exemplary method for retrieving map data, as described in FIG. 3 and FIG. 4.

As shown in FIG. 12, first, the map display apparatus retrieves a version of a map disc stored in a server (information center) from the server (S1). Next, a determination is made whether the map display apparatus (in-car terminal device) stores data about the starting point and the destination in the same version as the server stores (S2). If the data in the same version is stored in the map display apparatus, the map display apparatus alone starts to search a route (S3). In step S2, if the data in the same version is not stored in the map display apparatus, the server searches a route based on its own stored data (S4), and the map display apparatus receives the route searched by the server (S5). Then, the map display apparatus retrieves the amount of map data used in searching the route in the server (S6). Next, the amount of map data is multiplied by the data-transmission expenses per minute. The result, i.e., total data-transmission expenses to be charged in the case where the map data is received by the map display apparatus is then displayed to the user (S7). Next, the user determines whether to receive the map data from the server (S8). When it is determined that the user does not want to receive the map data, the method stops. However, when it is determined that the user wants to receive the map data, only a certain portion of the map data that has never been received by the map display apparatus is transmitted from the server (S9).

Alternatively, after S4, the map display apparatus receives route features information, such as, for example, a charge for a toll road, an estimated time of arrival, and a route distance) and further determines whether to receive the map data based on such route features. When it is determined that the map data is to be received, the map data related to the searched route, for example, the display data and the guidance data shown in FIG. 2, is received from the server.

Figure 13:
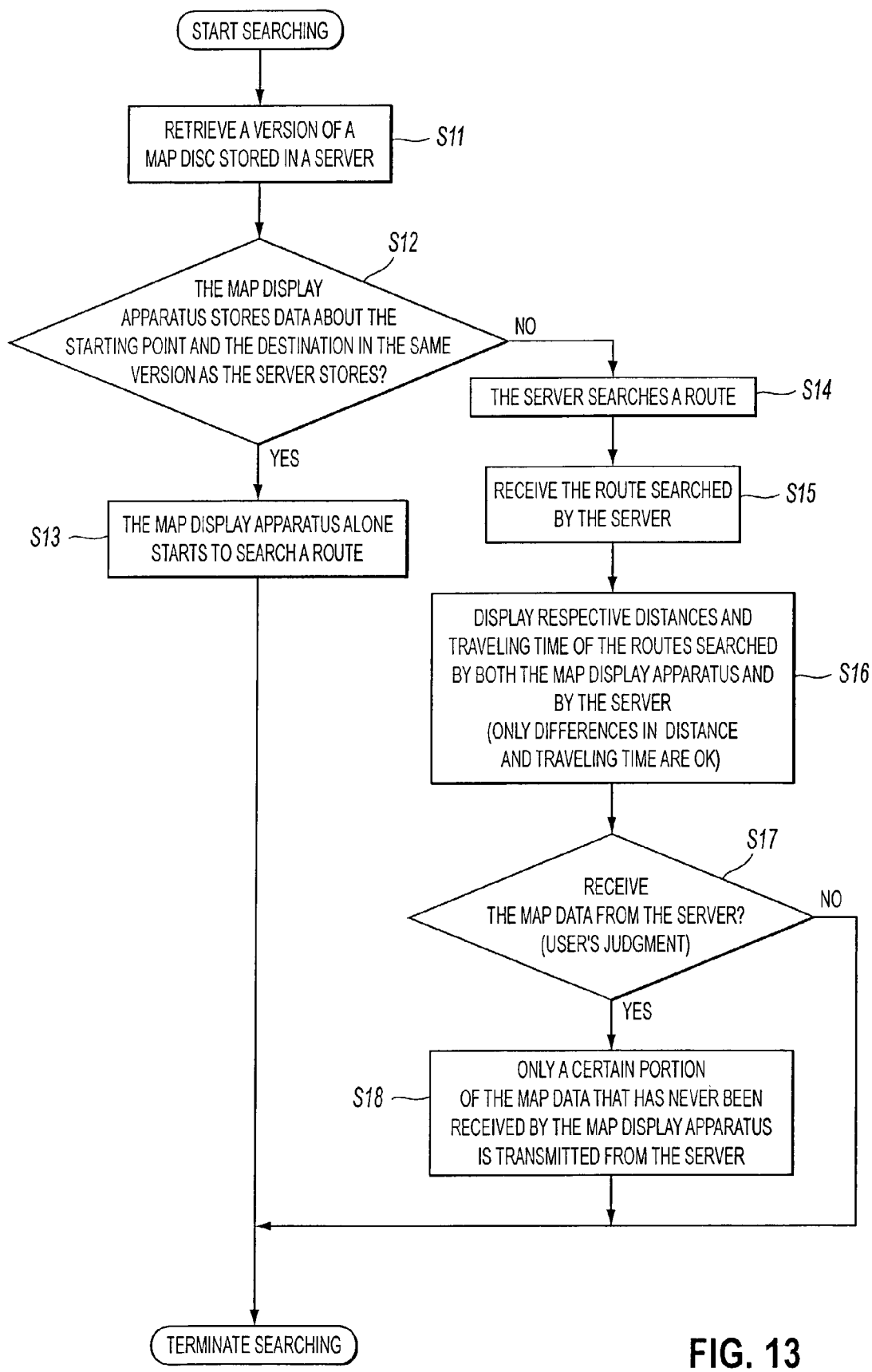
FIG. 13 is another exemplary embodiment of a flowchart showing a method for retrieving map data.

FIG. 13 is a flowchart showing an exemplary method for retrieving map data, as described in FIG. 9.

As shown in FIG. 13, first, the map display apparatus retrieves a version of a map disc stored in a server (S11). Next, a determination is made whether the map display apparatus stores data about the starting point and the destination in the same version as the data in the server stores (S12). If the same version data is stored in the map display apparatus, the map display apparatus alone starts to search a route (S13). In S12, if the same version data is not stored in the map display apparatus, the server searches a route based on the data stored in itself (S14), and the map display apparatus receives the route searched by the server (S15). Then, the map display apparatus displays distances and traveling time of the routes searched by both the map display apparatus and by the server (S16). Alternately, only differences in distance and traveling time between the route searched by the map display apparatus and the route searched by the server may be displayed onto the display screen. The user's determination whether to receive the map data from the server is next expected (S17). When it is determined that user does not want to receive the map data, the method stops. However, when it is determined that user wants to receive the map data, only a certain portion of the map data that has never been received by the map display apparatus is transmitted from the server (S18).

Alternatively, after S14, the map display apparatus receives route features information, such as, for example, a charge for a toll road, an estimated time of arrival, and a route distance, and further determines whether to receive the map data based on such route features. When it is determined that user wants to receive the map data, the map data related to the searched route (i.e., the display data and the guidance data shown in FIG. 2) are received from the server.

Figure 14:
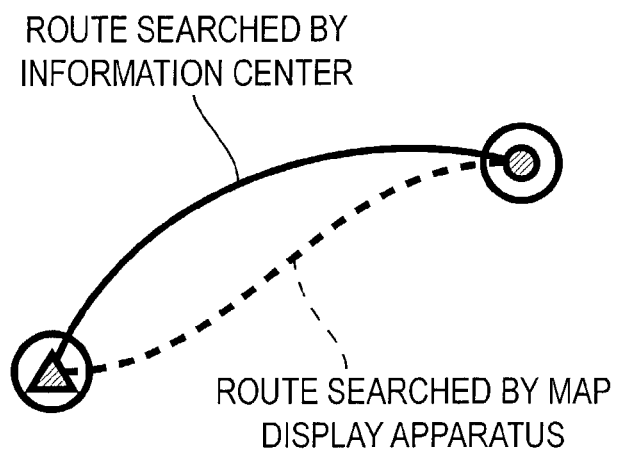
FIG. 14 exemplarily shows two different routes respectively searched by a server (the information center) and the in-car terminal device.

Regarding the route search, there are sometimes cases where a route searched by the information center (server) is different from a route searched by the in-car terminal device (map display apparatus) as shown in FIG. 14 under the condition that the route search is respectively performed by the information center and the in-car terminal device. One of the reasons for such difference is that the server can regularly update its data while the map display apparatus depends on only the data stored in the disc which quickly gets out-of-date. For the map display apparatus using the disc, searchable road is limited to what existed when the road data was stored into the disc. In order to deal with such a difference in searched route, the following steps may be taken. First, a route search is performed by both the map display apparatus and the server. Next, the searched routes are compared with each other in terms of data-transmission expenses and data-transmission response time both required in retrieving the up-to-date data from the server. Then, an automatic determination is made whether to retrieve the data from the server. Next, when it is determined the data needs to be retrieved, a request is made to the server for transmission of the up-to-date data.

Figure 15:
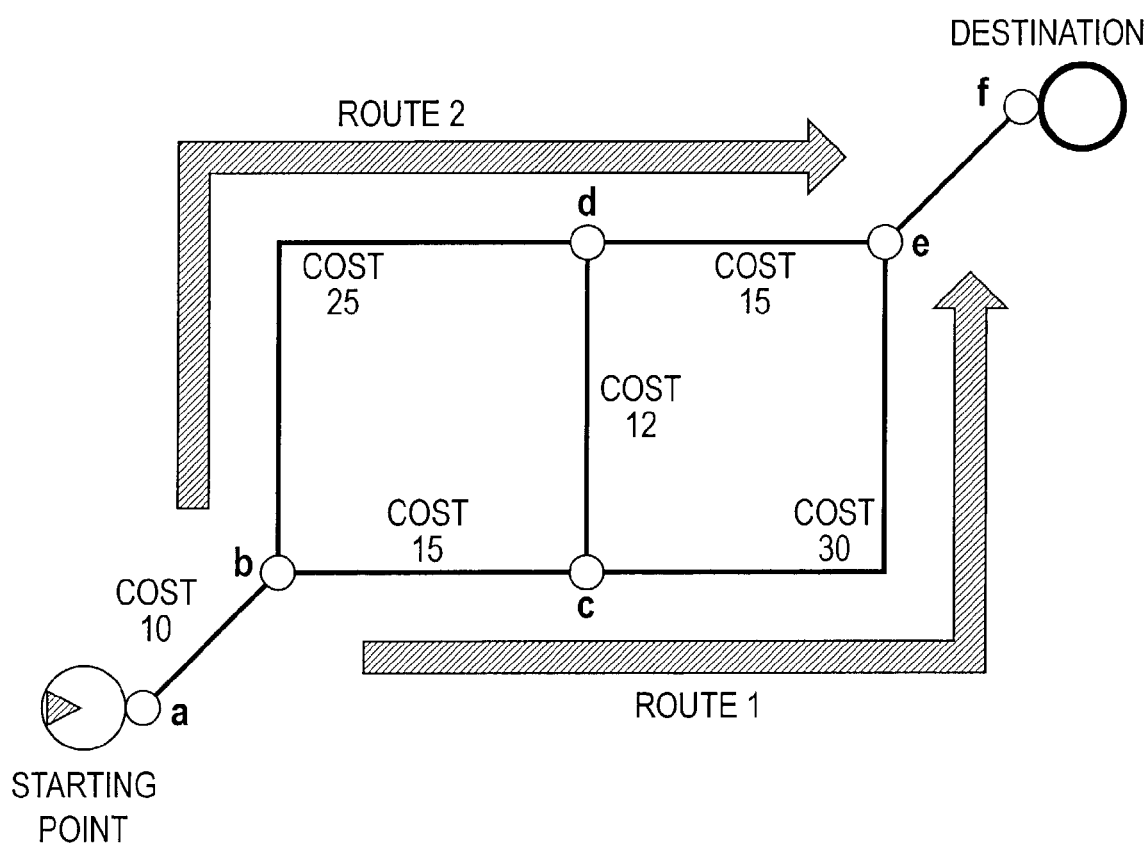
FIG. 15 exemplarily shows a cost weighed on a route to be searched.

With reference to FIG. 15, the above steps will be specifically described in reference to a "cost" weighed on a road for searching a route.

In FIG. 15, each point (a), point (b), point (c), point (d), point (e), and point (f) is called as a node which represents an intersection. A distance between point (a) and point (b) is called as a link which represents a road. A cost represents a value. The value is such that the distance is multiplied by a certain coefficient which changes according to road types, such as, for example, an expressway, a national road, and a county road, as well as changes according to a width of a road. A penalty cost is added when the speed of the vehicle slows down, for example, when passing the intersection with the traffic light or turning the intersection to the right or the left.

As shown in FIG. 15, link (a)–(b) is weighed by cost 10, link (b)–(c) is weighed by cost 15, link (b)–(d) is weighed by cost 25, link (c)–(d) is weighed by cost 12, link (c)–(e) is weighed by cost 30, and link (d)–(e) is weighed by cost 15. Based on such costs, the in-car terminal device searches the shortest route. Further, in FIG. 15, Route #1, which passes through point (a), point (b), point (c), point (d), and point (f), is weighed by a total cost value of 60. Route #2, which passes through point (a), point (b), point (d), point (e), and point (f) is weighed by a cost value of 55. When Route #1 is compared with Route #2 and it is found that the cost weighed on Route #2 is smaller than that weighed on Route #1, Route #2 is selected as the shortest route.

When comparing the cost weighed on a route searched by the server (hereinafter called, cost S) with the cost weighed on a route searched by the map display apparatus (hereinafter called, cost C), a consideration is made whether there is an advantage of the data-transmission (for retrieving the data) when the cost S is smaller than the cost C. Only in that case, it is desirable that the data be transmitted from the server to the map display apparatus.

In order to determine the desirability of the data-transmission, a disadvantage of the data-transmission is expressed and converted to the cost as follows:

Converted cost of data-transmission expenses=A×data-transmission expenses E

Converted cost of data-transmission time=B×data-transmission time T

Figures 16, 17:
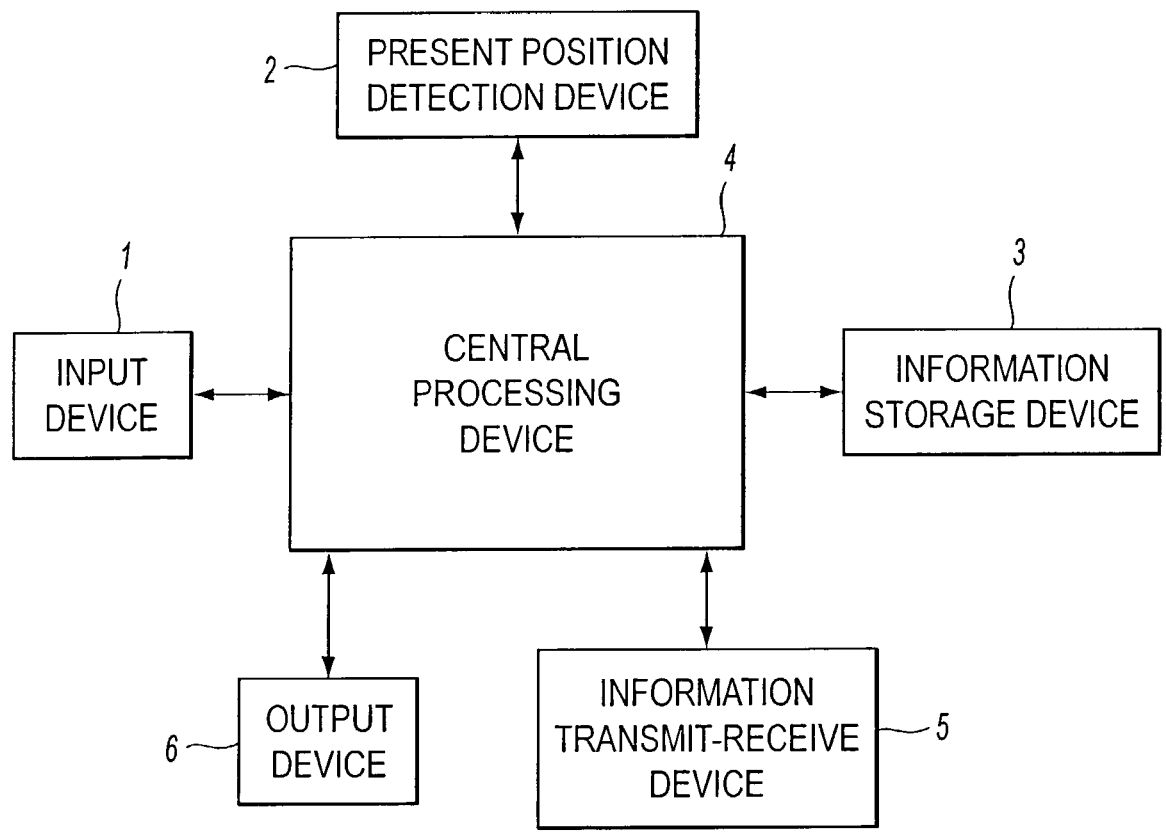
FIG. 16 exemplarily shows a conversion coefficients setting screen.
FIG. 17 shows an exemplary embodiment of an in-car terminal device.

Here, the data-transmission expenses E and the data-transmission time T are determined according to the amount of the data transmitted from the information center (server); and both A and B represent conversion coefficients. As the data-transmission parameters are set in the setting screen in FIG. 6, likewise, the conversion coefficients of the data-transmission expenses, the data-transmission time, and the travel distances, which are all required in searching a route, are set in a conversion coefficients setting screen as shown in FIG. 16. In FIG. 16, an expense of 1 Yen (One Yen) is converted to a distance of 0.3 m, time of 1 min. (One minute) is converted to a distance of 5.0 m, and difference in travel distance of 1 m (One meter) between the route searched by the server and the route searched by the map display apparatus is converted to a distance of 0.5 m. These conversion coefficients are influenced by what the user highly regards in searching a route. With the above conversion coefficients, the following equation is used to determine whether to perform the data-transmission:

Converted cost of data-transmission expenses+Converted cost of data-transmission time<Cost C−Cost S Here, the expression (Cost C−Cost S) on the right side of the "<" sign represents the benefit of retrieving the data from the server. Specifically, if the right side (Cost C−Cost S) is greater than the left side (Converted cost of data-transmission expenses+Converted cost of data-transmission time), the data-transmission from the server is recommended.

The disadvantage of the data-transmission expenses can be determined as follows: subtract charges for a toll road located on the route searched by the map display apparatus from charges for a toll road located on the route searched by the server, and then compare the subtracted charges with the data-transmission expenses required in receiving the route searched by the server. Specifically, such determination is expressed as follows when a toll charged for the route searched by the server is represented as Toll S and a toll charged for the route searched by the map display apparatus is represented as Toll C:

Data-transmission expenses E<Toll C−Toll S

The right side (Toll C−Toll S) of the "<" sign of the above expression shows the expenses which would be economically saved if the data is retrieved from the server. Therefore, if the right side (Toll C−Toll S) is greater than the left side (Data-transmission expenses E), the data-transmission from the server is recommended.

The disadvantage of the data-transmission time can be determined as follows: subtract estimated time of arrival for the route searched by the map display apparatus from estimated time of arrival for the route searched by the server, and then compare the subtracted estimated time of arrival with the data-transmission time required in receiving the route searched by the server. When the estimated time of arrival for the route searched by the server is represented as Time S and the estimated time of arrival for the route searched by the map display apparatus is represented as Time C, such determination is expressed as follows:

Data-transmission time T<Time C−Time S

The right side (Time C−Time S) of the "<" sign of the above expression shows the time that would be economically saved if the data is retrieved from the server. Therefore, if the right side (Time C−Time S) is greater than the left side (Data-transmission time T), the data-transmission from the server is recommended.

The above determinations (expressions) are generalized or integrated into the following expressions:

$$A \times ((\text{Toll}C\text{-Toll}S) - \text{Data-transmission expenses}E) + B \times ((\text{Time}C\text{-Time }S) - \text{Data-transmission time}T) < (\text{Cost}C\text{-Cost}S)$$

The above expression indicates that there is a benefit or advantage of data-transmission if the right side (Cost C−Cost S) representing the merit of retrieving the data from the server is greater than the left side representing converted cost of data-transmission expenses and data-transmission time. When it is determined that the expression is satisfied, the map display apparatus automatically makes a request to the information center for transmission of the data. If necessary, such determination result is provided to the user so that the user himself can make such request to the information center instead of the map display apparatus.

Although the map display apparatus determines whether to retrieve the data in the foregoing case, such function can be also applied to the information center. Thus, the desirability of data-transmission can be automatically determined at the information center through the comparison of the merit of the data-transmission with the converted cost of data-transmission expenses and data-transmission time. When the information center determines such desirability of data-transmission, the map display apparatus has to only transmit the destination data and the searched route to the information center. This relieves the map display apparatus from processing the data-transmission determination.

In another exemplary embodiment, a method of determining whether to retrieve the data from the information center comprises the following steps. First, a charge for a toll road located on the route searched by the map display apparatus is subtracted from a charge for a toll road located on the route searched by the information center. The subtracted charges are then compared with the data-transmission expenses required in receiving the route searched by the information center. Next, a determination is made whether there is a merit in retrieving the map data from the information center.

FIG. 17 shows an exemplary embodiment of the in-car terminal device according to the invention.

As shown in FIG. 17, the in-car terminal device includes an input device 1 used for inputting information necessary for route guidance, such as a starting point and a destination; a present position detection device 2 that detects a present position of a vehicle; an information storage device 3 to store map data, navigation data for a route search, guidance data for visual/vocal route guidance, a computer program or routine (such as an application and/or OS) for map display, a program for a route search, and a program for vocal guidance; a central processing device 4 as a navigation processing device for performing map display processing, route search processing, and visual/vocal guidance processing for a route guidance, the navigation processing device being used also to control the entire system; an information transmit-receive device 5 to transmit/receive information necessary for the travel of the vehicle, such as, road information and traffic information, the information transmit-receive device 5 being used to also detect and transmit/receive information about the present position of the vehicle; and an output device 6 such as a display and a speaker to output information about route guidance.

In various exemplary embodiments, the input device 1 has various functions including for example, selecting a map, inputting a destination, as well as, commanding the central processing device 4 to perform navigation processing at a user's request. For carrying out such functions, the input device 1 is provided with means like a remote control such as a touch-switch or a jog-dial whereby a destination is inputted based on a telephone number or coordinates on the map, and whereby the route guidance is requested. Further, the input device 1 may include an interactive device, such as a voice input device for inputting voices. Additionally, the input device 1 may include a record card reading device for reading data recorded on an IC card or a magnetic card. Still further, the input device 1 may include a data-transmission device for transmitting data to several information sources: such as an information center that stores data necessary for navigation as well as transmits information via a line of data-transmission at the request of the user; and a portable electronic equipment that stores map data, destination data, rough map data, and building-shape map data.

In various exemplary embodiments, the present position detection device 2 typically includes sensors for retrieving present position information about the vehicle. For example, using the GPS (Global Positioning System), height information about the vehicle may be retrieved. Further, the present position detection device 2 may include an absolute bearing sensor for detecting an absolute travel direction of the vehicle with geomagnetism; an relative bearing sensor for detecting a relative travel direction of the vehicle with a steering sensor or a gyro sensor; a speed/distance sensor for detecting a travel speed and a travel distance of the vehicle based on the number of rotations of vehicle wheels; and a sensor for detecting acceleration of the vehicle to retrieve present position information including height information of the vehicle.

In various exemplary embodiments, the information storage device 3 used as an external storage device to store programs and data for navigation may be, for example, an optical disc such as a CD-ROM or a DVD-ROM, a magnetic disc such as a floppy disc or a hard disc, and a magneto-optical disc (MO). The programs are such as, a program for route search processing, a program for a routine described in flowcharts of the present embodiment, a program for display output control required in the route guidance, a program for interactive route guidance based on voice input and data used therein, and a program and data for voice output control required in the voice guidance. Data stored in the information storage device 3 may include, for example, map data, road data, name data including names of administrative districts and area names, search data, searched route data, guidance data, map-matching data, destination data, memory point data, travel history data, facility data, image data of turnings such as intersections, type data, and landmark data. All of these data are necessary and used in the map display apparatus. These data are updated by downloading up-to-date data from the information center. Further, in an alternative embodiment, the data and programs may be respectively stored in the information storage device and the central processing device.

In various exemplary embodiments, the central processing device 4 includes: a CPU for performing various computations; a flash memory for reading out a program from the information storage device 3, and then for storing the program; a ROM for performing programmed check stored in the flash memory as well as for storing a program (i.e., a program-reading means) for update processing; and a RAM for storing guidance information about the searched route temporarily, the guidance information is such as point coordinates of an inputted destination and a road name code number, and further, said RAM for storing data which is under the computation. Further, the central processing device 4 may include: a frame memory for storing data to be displayed onto the output device such as a display; a voice processor for performing interactive processing based on the voice inputted from the input device 1, and further for synthesizing and converting voices, phrases, compound sentences, and sounds read out from the information storage device 3, in response to voice output control signals from the CPU, into analog signals to be outputted to the speaker; a data-transmission interface for transmitting input/output data and a sensor input interface for capturing sensor signals sent from the present position detection device 2; and a clock to be referred when a date and time are inputted into internal diagnostic information. Further, in another way, said program for the update processing may be stored into the external storage device.

Further, both, software programs about the present embodiment, as well as other programs for navigation may be stored into the external storage device; otherwise, some part or all of such programs may be stored into the ROM in the central processing device 4. These data and programs stored in the external storage device are inputted as external signals into the central processing device included in the map display apparatus, and thereby the various navigation functions are achieved through the computation of said inputted external signals.

Further, the various navigation functions can be achieved as follows. First, all programs for the present embodiment, other programs for the navigation, or some part or all of the map data are transmitted from the information center (such as a Internet server or a navigation server) to a plurality of base stations (a communication station connected to an Internet provider terminal or the vehicle). Then, the central processing device 4 included in the in-car terminal device uses the information transmit/receive device in order to receive the information transmitted from the base station. The received information is then downloaded into any readable/writable memories (such as a RAM, a flash memory, and a hard disk) in the central processing device 4 so that the programs for various navigation functions may be run. In this regard, the programs and the data may be respectively stored in different readable/writable memories. For example, the programs and the data may be respectively stored in the flash memory and the RAM; otherwise, the programs and the data may be stored into one readable/writable memory.

Still further, in an alternate embodiment, various navigation functions are achieved as follows. First, some part or all of the program or the map data is downloaded from the information center into a removal storage medium (such as an IC card, a magnetic card, or a floppy disc) by means of a home-use personal computer. Then, the removal storage medium connects to the central processing device 4 so that the programs for the various navigation functions stored in such storage medium may be run.

The map display apparatus according to one exemplary embodiment includes: a large-capacity flash memory for reading the programs from the external storage device as well as reading the programs downloaded from the information center; and a small-capacity ROM for storing a program (as a program-reading means) for starting a CD. Specifically, said flash memory is a nonvolatile storage means in which the stored information is retained even when a power supply disconnected. For starting the CD, the program (as a program-reading means) stored in the ROM is run in order to perform the programmed check stored in the flash memory, and then disc control information stored in the information storage device 3 is read out. Program-loading processing (or update processing) depends on the state of the disc control information and the flash memory.

In various exemplary embodiments, the information transmit/receive device 5 may include a data transceiver device by which the information is transmitted between the information center and the vehicle. For example, the data transceiver may include a GPS receiver to receive information via GPS (Global Positioning System), a VICS receiver, a portable telephone, and a personal computer, which all can receive information via FM multiple broadcasting, a radio beacon, and an optical beacon.

In various exemplary embodiments, the output device 6 has a function in which guidance information is outputted vocally and/or visually to the screen on demand. Further, the output device 6 has a function of outputting the data, over which the navigation processing is performed by the central processing device 4, to a printer. In order to perform these functions, the output device 6 comprises the following devices: a memory for expanding and drawing the data processed by the central processing device 4 as well as the data stored in the information storage device 3 so that such data may be displayed onto a display screen; a display on which image data drawn by the memory is displayed; a printer for outputting the data processed by the central processing device 4 as well as for outputting the data stored in the information storage device 3; and a speaker for outputting the route guidance vocally.

Onto said display such as a simple liquid crystal display, the followings may be displayed: an enlarged view of the intersection, a destination name, time, a distance, an arrow representing a travel direction, which are all expanded and drawn based on the display data and the guidance data related to a map which processed by the central processing device 4. Specifically, the image data depicted onto the display takes binary form (i.e., bitmap data). The display data and the guidance data processed by the central processing device 4 are received via a single data-transmission line for a serial data-transmission or may be received via another data-transmission line which is used for other functional purposes. The display data and guidance data transmitted via the data-transmission line are expanded and drawn by the memory in the output device 6. Then, the data which expanded and drawn data only for a designated display area are depicted onto the display screen.

This display screen is placed on the instrumental panel provided close to the driver. The display screen provides the user with the present position of the vehicle and information about the route to be guided. Alternatively, such display may take a form of a head-up display. In this head-up display, the guidance may be presented to the user through a half mirror embedded in a windshield of the vehicle so that the user can see the guidance without lowering his/her sight. Further, in another way, a tablet such as a touch-panel or a touch-screen may be used as the display screen. By touching the screen or tracing what is shown on the screen, the user can input a point or a road.

Thus, the above discussed embodiments provide the user with many advantages. The user can judge/determine whether to retrieve the data from the information center in light of data-transmission expenses and the data-transmission time required in receiving the up-to-date map data from the information center. This benefits the user in that the unnecessary data is not retrieved and thereby the data-transmission expenses are saved. Further advantageously, according to the above embodiments, only the data that covers the area, where the already-retrieved data and the to-be-retrieved data do not overlap, may be selectively retrieved. This feature further leads to the reduction of the data-transmission expenses and acceleration of data-transmission response. At the same time, such data retrieval enables the user to search a route based on the up-to-date data transmitted from the information center, which making the route search more reliable. Still further, the judgment/determination whether to retrieve the data may be made either by the information center or by the map display apparatus. When the information center takes over such determination, the burden which otherwise would have to be handled by the map display apparatus becomes much lighter.

Although only some exemplary embodiments of this invention have been described in detail above, those skilled in the art will readily appreciate that many modifications are possible in the exemplary embodiments without materially departing form the novel teachings and advantages of this invention. Accordingly, all such modifications are intended to be included within the scope of this invention.

The disclosure of each of Japanese Patent Application Nos. 2001-392302 and 2001-392303, both filed Dec. 25, 2001 including specification, drawings and claims is incorporated herein by reference in its entirety.

What is claimed is:

1. A map display apparatus for receiving and displaying map data transmitted from an information center, comprising:

a reporting device to report data-transmission expenses or data-transmission time required in receiving the map data from the information center;

a determining device that allows a user to determine whether to receive the map data from the information center; and a requesting device to request the information center to transmit the map data upon a user's determination of receiving the map data.

2. A map display apparatus according to claim 1, wherein the map data is a subtract data, the map data from the information center and a map display apparatus map data stored in the map display apparatus do not overlap each other.

3. A map display apparatus according to claim 1, wherein the map data is a searched route.

4. A map display apparatus according to claim 1, wherein the map data includes an area determined based on a present position of a vehicle and a destination.

5. A map display apparatus according to claim 1, wherein the amount of the map data transmitted from the information center is provided to the user and the data-transmission expenses or the data-transmission time are calculated based on the amount of the received map data and data-transmission parameters given by the data-transmission device included in the map display apparatus.

6. A map display apparatus for receiving and displaying map data transmitted from an information center, comprising:

a data-transmission device to transmit destination data to the information center;

a searching device to search a route to a destination; and a reporting device to report a searched route data of the map display apparatus and a transmitted route data transmitted from the information center by comparing the searched route data and the transmitted route data.

7. A map display apparatus according to claim 6, wherein the searched route data and the transmitted route data include at least one of a charge for a toll road, an estimated time of arrival and a route distance.

8. A map display apparatus according to claim 6, further comprising a determining device that allows a user to determine whether to receive the map data from the information center.

9. A map display apparatus for receiving and displaying map data transmitted from an information center, comprising:

a data-transmission device to transmit destination data to the information center;

a searching device to search a route to a destination;

a determining device to determine whether to receive map data from the information center by comparing the searched route with a route transmitted from the information center; and a requesting device to request the information center to transmit of the map data upon a determination of receiving the map data.

10. A map display apparatus according to claim 9, wherein the determining device subtracts charges for a toll road located on the route searched by the map display apparatus from charges for a toll road located on the route searched by the information center, and the subtracted charges are compared with the data-transmission expenses required in receiving the route searched by the information center so as to determine whether to receive the map data.

11. A map display apparatus according to claim 9, wherein the determining device determines that the map data is to be received when a difference in cost between the route searched by the map display apparatus and the route searched by the information center is greater than converted costs of the data-transmission expenses and the data-transmission time.

12. A map display apparatus according to claim 9, wherein the map display apparatus includes setting device to set cost conversion coefficients to convert cost of data-transmission expenses, data-transmission time, and a travel distance.

* * * * *